US012573917B2

(12) United States Patent
Tang et al.

(10) Patent No.: US 12,573,917 B2
(45) Date of Patent: Mar. 10, 2026

(54) POWERTRAIN, NOISE SUPPRESSION METHOD, AND ELECTRIC VEHICLE

(71) Applicant: Huawei Digital Power Technologies Co., Ltd., Shenzhen (CN)

(72) Inventors: Zhengyi Tang, Shenzhen (CN); Xueyu Mei, Shanghai (CN); Bayaer Eerhemu, Shanghai (CN); Jinhua Chen, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 706 days.

(21) Appl. No.: 17/891,272

(22) Filed: Aug. 19, 2022

(65) Prior Publication Data

US 2022/0399787 A1 Dec. 15, 2022

(30) Foreign Application Priority Data

Aug. 24, 2021 (CN) .......................... 202110973638.3

(51) Int. Cl.
*H02K 11/028* (2016.01)
*H02K 11/33* (2016.01)

(52) U.S. Cl.
CPC ........... *H02K 11/028* (2013.01); *H02K 11/33* (2016.01)

(58) Field of Classification Search
CPC .............................. H02K 11/028; H02K 11/33
See application file for complete search history.

(56) References Cited

U.S. PATENT DOCUMENTS

| | | | |
|---|---|---|---|
| 6,865,466 B2 | 3/2005 | Voight et al. | |
| 11,677,343 B1 * | 6/2023 | Wang ................... | B64U 30/297 |
| | | | 318/400.34 |
| 2009/0149999 A1 | 6/2009 | Schramm et al. | |
| 2013/0257207 A1 | 10/2013 | Nemoto et al. | |

(Continued)

FOREIGN PATENT DOCUMENTS

| | | |
|---|---|---|
| CN | 101879867 A | 11/2010 |
| CN | 105426559 A | 3/2016 |

(Continued)

OTHER PUBLICATIONS

Fang Yuan et al "Vibroacoustic Characterization of a Permanent Magnet Synchronous Motor Powertrain for Electric Vehicles," IEEE Transactions on Energy Conversion, IEEE Service Center, Piscataway, NJ, US, vol. 33, No. 1, Mar. 1, 2018, pp. 272-280, XP011677893, 9 pages.

(Continued)

*Primary Examiner* — Zoheb S Imtiaz
(74) *Attorney, Agent, or Firm* — Conley Rose, P.C.

(57) ABSTRACT

A drive motor and a retarder in a powertrain meet a condition that a harmonic order of the drive motor is the same as a quantity of gear teeth of an input shaft gear in the retarder such that a frequency of an electromagnetic noise harmonic generated by the drive motor is the same as a frequency of a noise harmonic generated by the retarder. When the drive motor and the retarder are coupled using a connection structure, a phase of the electromagnetic noise harmonic generated by the drive motor differs from a phase of the noise harmonic generated by the retarder by a set angle.

20 Claims, 5 Drawing Sheets

Principle of reverse suppression

Electromagnetic noise generated by a drive motor

Noise generated by a retarder

Noise after reverse suppression

Step 1: Design a harmonic order of a drive motor to be the same as a quantity of teeth of an input shaft gear of a retarder Step 2: Design a set angle between a phase of harmonic torque of the drive motor and a phase of fluctuating torque of the input shaft gear of the retarder Step 3: An MCU performs software control

(56) References Cited

U.S. PATENT DOCUMENTS

| | | | |
|---|---|---|---|
| 2016/0111986 A1* | 4/2016 | Vollmer | H02P 21/14 |
| | | | 318/400.23 |
| 2016/0311305 A1 | 10/2016 | Ichikawa et al. | |
| 2018/0026564 A1* | 1/2018 | Hennen | H02P 27/06 |
| | | | 318/801 |
| 2018/0374468 A1 | 12/2018 | Sung et al. | |
| 2019/0066653 A1 | 2/2019 | Speidel et al. | |
| 2021/0134260 A1 | 5/2021 | Chang | |

FOREIGN PATENT DOCUMENTS

| | | |
|---|---|---|
| CN | 106763642 A | 5/2017 |
| CN | 107070367 A | 8/2017 |
| CN | 110082104 A | 8/2019 |
| CN | 211641805 U | 10/2020 |
| CN | 111916047 A | 11/2020 |
| CN | 112248801 A | 1/2021 |
| CN | 112398399 A | 2/2021 |
| CN | 112910336 A | 6/2021 |
| CN | 112953331 A | 6/2021 |
| CN | 112989509 A | 6/2021 |
| CN | 113054877 A | 6/2021 |
| CN | 113224878 A | 8/2021 |
| DE | 102016109294 A1 | 11/2016 |
| GB | 2565121 A | 2/2019 |
| JP | H08284526 A | 10/1996 |
| JP | 2019035419 A | 3/2019 |
| JP | 2020172993 A | 10/2020 |
| JP | 2021097512 A | 6/2021 |
| KR | 20090055879 A | 6/2009 |
| KR | 20190088261 A | 7/2019 |
| WO | 8802912 A1 | 4/1988 |
| WO | 2010143030 A1 | 12/2010 |
| WO | 2019025774 A1 | 2/2019 |

OTHER PUBLICATIONS

Fang Yuan et al., Research of the Mothed of Finite Element Modeling of an Electric Automotive Powertrain, Journal of Mechanical Transmission, 2015, with an English abstract, 6 pages.

Yu peng et al., Acoustic Characteristic Analysis of Central Driven Power Train of Electric Vehicle, Research Development, 2015, with an English abstract total 7 pages.

Wang Peiqi et al., Modal Analysis of Electric Powertrain Components Based on Hypermesh, Coal Mine Machinery, Oct. 2017, with an English abstract, 3 pages.

* cited by examiner

POWERTRAIN, NOISE SUPPRESSION METHOD, AND ELECTRIC VEHICLE

CROSS-REFERENCE TO RELATED APPLICATIONS

This application claims priority to Chinese Patent Application No. 202110973638.3 filed on Aug. 24, 2021, which is hereby incorporated by reference in its entirety.

TECHNICAL FIELD

The present disclosure relates to the field of powertrain technologies, and in particular, to a powertrain, a noise suppression method, and an electric vehicle.

BACKGROUND

With development of an automobile industry and improvement of automobile quality, noise, vibration, and roughness (NVH) of a vehicle have become one of key indicators of automobile performance. For a new energy vehicle, noise generated by a powertrain is a main source that affects NVH performance of the vehicle. How to reduce impact of the powertrain on the NVH performance of the vehicle is an urgent problem to be resolved currently.

SUMMARY

To resolve the foregoing problem, embodiments of this application provide a powertrain, a noise suppression method, and an electric vehicle. An electromagnetic noise harmonic generated by a drive motor reversely offsets a noise harmonic generated by a retarder, to reduce noise of the powertrain. Further, based on a harmonic obtained after the electromagnetic noise harmonic generated by the drive motor reversely offsets the noise harmonic generated by the retarder, the drive motor generates another harmonic with a same frequency and a reverse phase, so that the harmonic reversely offsets the offset harmonic, thereby greatly reducing the noise of the powertrain.

Therefore, embodiments of this application use the following technical solutions.

According to a first aspect, this application provides a powertrain, including a connection structure, a drive motor, including a motor shaft, where one end of the motor shaft is embedded and fastened to the connection structure, a retarder, including a first gear, a second gear, and an input shaft, where the first gear is meshed with the second gear, one end of the input shaft is embedded in and fastened to the first gear, and the other end of the input shaft is embedded in and fastened to the connection structure. A relationship between a quantity of rotor magnetic poles of the drive motor and a quantity of gear teeth of the first gear meets that a frequency of an electromagnetic harmonic generated by the drive motor is the same as a frequency of a noise harmonic generated by the retarder. A connection relationship between the retarder and the drive motor that are connected by using the connection structure meets that a phase of the electromagnetic harmonic generated by the drive motor differs from a phase of the noise harmonic generated by the retarder by a set angle.

In this implementation, the selected drive motor and retarder need to meet that the quantity of the rotor magnetic poles of the drive motor is in a specific proportion to a quantity of gear teeth of an input shaft gear in the retarder, to ensure that the frequency of the electromagnetic noise harmonic generated by the drive motor is the same as the frequency of the noise harmonic generated by the retarder. In a process of installing the drive motor and the retarder, when the drive motor and the retarder are connected by using the connection structure, it needs to be ensured that the phase of the electromagnetic noise harmonic generated by the drive motor differs from the phase of the noise harmonic generated by the retarder by a set angle, so that when the powertrain operates, electromagnetic noise of the drive motor can reversely offset noise generated by the input shaft gear on the retarder to reduce noise.

In an implementation, that a relationship between a quantity of rotor magnetic poles of the drive motor and a quantity of gear teeth of the first gear meets that the frequency of the electromagnetic harmonic generated by the drive motor is the same as the frequency of the noise harmonic generated by the retarder includes when a harmonic order of the drive motor is the same as the quantity of the gear teeth of the first gear, the frequency of the electromagnetic harmonic generated by the drive motor is the same as the frequency of the noise harmonic generated by the retarder, where the harmonic order of the drive motor is in a specific proportion to the quantity of the rotor magnetic poles of the drive motor.

In this implementation, the harmonic order of the drive motor is generally related to both the quantity of the rotor magnetic poles of the drive motor and the quantity of the gear teeth of the input shaft gear (that is, the first gear) in the retarder. The quantity of the rotor magnetic poles is multiplied by a dielectric constant of the drive motor. An obtained quantity and the quantity of the gear teeth of the input shaft gear in the retarder may be associated with the quantity of the rotor magnetic poles and the quantity of the gear teeth of the input shaft gear in the retarder, to ensure that the frequency of the electromagnetic harmonic generated by the drive motor is the same as the frequency of the noise harmonic generated by the retarder.

In an implementation, that a connection relationship between the retarder and the drive motor that are connected by using the connection structure meets that a phase of the electromagnetic harmonic generated by the drive motor differs from a phase of the noise harmonic generated by the retarder by a set angle includes, when the retarder is connected to the drive motor by using the connection structure, an included angle between a direction of a connection line between a first gear center and a second gear center on the retarder, and a direction of a phase A of a stator winding in the drive motor meets that the phase of the electromagnetic harmonic generated by the drive motor differs from the phase of the noise harmonic generated by the retarder by the set angle.

In this implementation, the phase of the electromagnetic noise harmonic generated by the drive motor is related to a phase of an electrical signal input to the drive motor, and the noise harmonic generated by the retarder is related to a meshing degree of the two gears. Therefore, when the drive motor is connected to the retarder by using the connection structure, a direction of a connection line between the phase A of the stator winding of the drive motor and centers of the two gears may be selected as a reference point, so that two factors, the phase of the electrical signal of the drive motor and the meshing degree of the retarder, are associated with the set angle, and the set angle is changed subsequently by adjusting the phase of the electrical signal and the meshing degree.

In an implementation, the set angle is between 150 degree (°) and 210°.

In this implementation, a phase of the electromagnetic noise harmonic generated by the drive motor differs from the phase of the noise harmonic generated by the retarder by an ideal angle of 180°, the noise can be reversely canceled, and noise reduction effect is most obvious. However, due to a case such as an offset in a component production, assembling, or use process, an ideal angle error of ±30° is allowed, and the noise reduction effect can also be achieved.

In an implementation, the powertrain further includes a control unit, connected to the drive motor, and configured to control a phase of an electrical signal input to the drive motor, so that the drive motor generates a compensation harmonic. The compensation harmonic is used to reversely offset the phase of the electromagnetic harmonic generated by the motor and the noise harmonic generated by the retarder.

In this implementation, after the electromagnetic noise harmonic generated by the drive motor reversely offsets the noise harmonic generated by the retarder, noise reduction is not necessarily completely implemented. Therefore, the phase of the electrical signal input to the drive motor is changed, so that the drive motor generates a compensation harmonic, and then reverse offsetting is performed. In this way, the noise reduction effect is optimal.

According to a second aspect, this application provides a noise suppression method, including determining a first harmonic obtained after a noise harmonic generated by a drive motor offsets a noise harmonic generated by a retarder, where a frequency of the noise harmonic generated by the drive motor is the same as a frequency of the noise harmonic generated by the retarder, and a phase of the noise harmonic generated by the drive motor differs from a phase of the noise harmonic generated by the retarder by a set angle, calculating a second harmonic based on the first harmonic, where the second harmonic is a harmonic having a frequency same as that of the first harmonic and having a phase reverse to that of the first harmonic, and sending a control instruction to the drive motor, wherein the control instruction is used to enable the drive motor to generate the second harmonic.

In this implementation, in a process of assembling a powertrain, a harmonic order of the drive motor is the same as a quantity of gear teeth of an input shaft gear in the retarder, and the phase of the noise harmonic generated by the drive motor is reverse to the phase of the noise harmonic generated by the retarder. In this way, the noise harmonic generated by the drive motor and the noise harmonic generated by the retarder reversely offsets each other, thereby achieving noise reduction effect. However, considering that an error exists in a production and installation process, noise reduction needs to be further performed. A harmonic obtained after the two harmonics reversely offset each other is simulated, and then a compensation harmonic having a frequency same as that of the offset harmonic and a phase reverse to that of the offset harmonic is simulated. A phase of an electrical signal input to the drive motor is controlled, so that the motor generates the compensation harmonic. By generating the compensation harmonic to reversely offset the offset harmonic, noise reduction effect of the powertrain is further improved.

In an implementation, determining a first harmonic obtained after a noise harmonic generated by a drive motor offsets a noise harmonic generated by a retarder includes receiving a drive motor parameter and a retarder parameter, calculating, based on the drive motor parameter and the retarder parameter, the noise harmonic generated by the drive motor and the noise harmonic generated by the retarder, and using the noise harmonic generated by the drive motor to offset the noise harmonic generated by the retarder, to obtain the first harmonic.

In an implementation, the set angle is between 150° and 210°.

In an implementation, sending a control instruction to the drive motor includes receiving an electrical signal parameter of the drive motor, where the electrical signal parameter includes a first phase parameter of an electrical signal, calculating, based on the phase of the second harmonic and the first phase parameter, a second phase parameter of the electrical signal input to the drive motor, and sending the control instruction to the drive, and adjusting a phase of the electrical signal input to the drive motor to a second phase.

According to a third aspect, this application provides a noise suppression apparatus, including a processing unit configured to determine a first harmonic obtained after a noise harmonic generated by a drive motor offsets a noise harmonic generated by a retarder, where a frequency of the noise harmonic generated by the drive motor is the same as a frequency of the noise harmonic generated by the retarder, and a phase of the noise harmonic generated by the drive motor differs from a phase of the noise harmonic generated by the retarder by a set angle, the processing unit is further configured to calculate a second harmonic based on the first harmonic, where the second harmonic is a harmonic having a frequency same as that of the first harmonic and having a phase reverse to that of the first harmonic, and a transceiver unit configured to send a control instruction to the drive motor, where the control instruction is used to enable the drive motor to generate the second harmonic.

In an implementation, the transceiver unit is configured to receive a drive motor parameter and a retarder parameter. The processing unit is further configured to calculate, based on the drive motor parameter and the retarder parameter, the noise harmonic generated by the drive motor and the noise harmonic generated by the retarder, and use the noise harmonic generated by the drive motor to offset the noise harmonic generated by the retarder, to obtain the first harmonic.

In an implementation, the set angle is between 150° and 210°.

In an implementation, the transceiver unit is configured to receive an electrical signal parameter of the drive motor, where the electrical signal parameter includes a first phase parameter of an electrical signal. The processing unit is further configured to calculate, based on the phase of the second harmonic and the first phase parameter, a second phase parameter of the electrical signal input to the drive motor, and send the control instruction to the drive, and adjust a phase of the electrical signal input to the drive motor to a second phase.

According to a fourth aspect, this application provides an electric vehicle, including the powertrain according to the possible implementations of the first aspect.

According to a fifth aspect, this application provides an electric vehicle, including at least one processor, where the processor is configured to execute instructions stored in a memory, so that the electric vehicle performs the method according to the possible implementations of the second aspect.

According to a sixth aspect, this application provides a computer-readable storage medium, where the computer-readable storage medium stores a computer program, and when the computer program is executed on a computer, the computer is enabled to perform the method according to the possible implementations of the second aspect.

According to a seventh aspect, this application provides a computer program product, where the computer program product stores instructions, and when the instructions are executed by a computer, the computer is enabled to perform the method according to the possible implementations of the second aspect.

BRIEF DESCRIPTION OF DRAWINGS

The following briefly describes the accompanying drawings describing some embodiments of this disclosure.

DESCRIPTION OF EMBODIMENTS

The following describes the technical solutions in embodiments of this application with reference to the accompanying drawings in embodiments of this application.

In descriptions of this application, locations or location relationships indicated by terms center, up, down, in front of, behind, left, right, vertical, horizontal, top, bottom, inside, outside, and the like are based on locations or location relationships shown in the accompanying drawings, and are merely intended for ease of describing this application and simplifying descriptions, instead of indicating or implying that a mentioned apparatus or component needs to be provided on a specific location or constructed and operated on a specific location, and therefore shall not be understood as limitations on this application.

In the descriptions of this application, it should be noted that, unless otherwise clearly specified and limited, terms mount, link, and connect should be understood in a broad sense, for example, may mean a fixed connection, may be a detachable connection, or may be a butt joint connection or an integrated connection. Persons of ordinary skill in the art can understand specific meanings of the foregoing terms in this application based on specific cases.

In the descriptions of this specification, the described specific features, structures, materials, or characteristics may be combined in a proper manner in any one or more of embodiments or examples.

Figure 1:
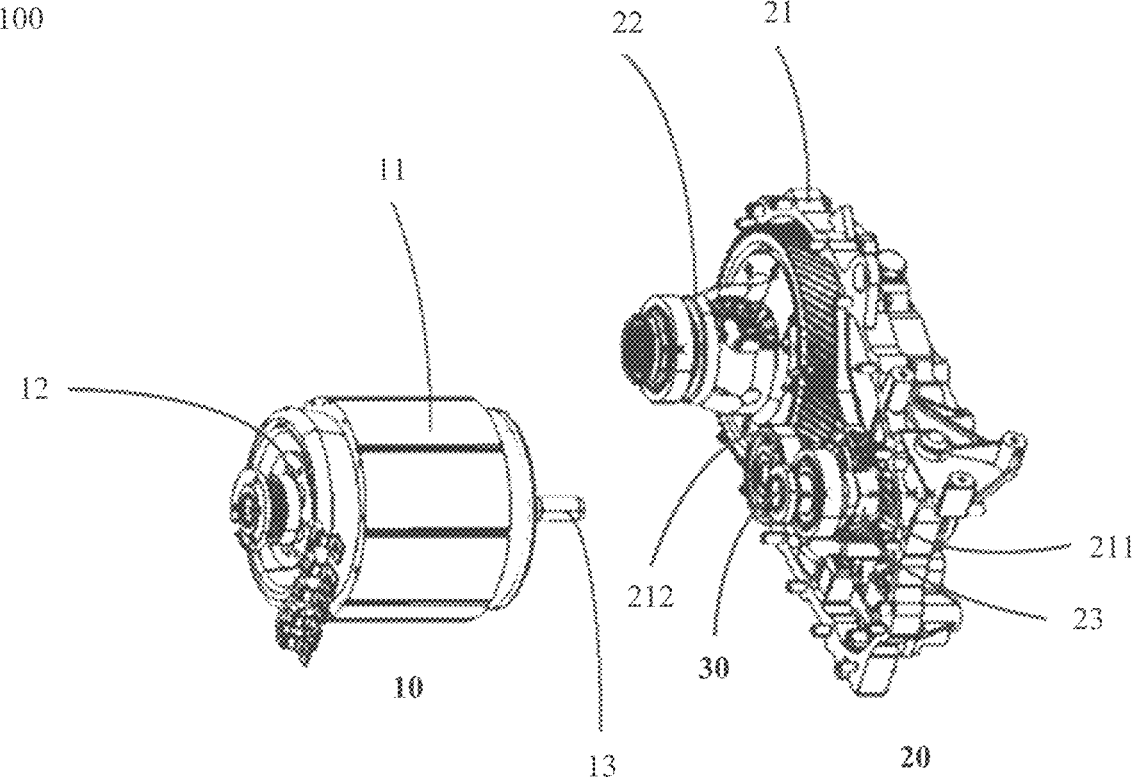
FIG. 1 is a schematic diagram of a structure of a powertrain according to an embodiment of this application.

FIG. 1 is a schematic diagram of a structure of a powertrain according to an embodiment of this application. As shown in FIG. 1, a powertrain 100 includes a drive motor 10, a retarder 20, and a connection structure 30. Structures of the three components and connection relationships between the three components are as follows.

The drive motor 10 generally includes a stator part 11, a rotor part 120, and a drive motor shaft 130. One end of the drive motor shaft 130 is embedded in the rotor part 120 and is fastened, and the rotor part 120 is embedded in the stator part 11. When the stator part 11 is energized with an alternating current, generated alternating flux interacts with permanent flux generated by the rotor part 120, so that the rotor part 120 rotates in the stator part 11, and drives the drive motor shaft 130 to rotate.

In this application, a type of the used drive motor 10 may be a radial magnetic field permanent magnet drive motor, or may be an axial magnetic field permanent magnet drive motor. This is not limited in this application. In addition, a type of the drive motor 10 may be a 6-pole 54-slot dual-V-shaped magnetic steel permanent magnet synchronous drive motor, a 4-pole 18-slot dual-V-shaped magnetic steel permanent magnet synchronous drive motor, or the like. This is not limited in this application either.

The retarder 20 usually includes a transmission assembly 21, an output shaft 22, and an input shaft 23. The transmission assembly 21 includes at least two gears, which are set as a gear 211 (that is, an input shaft gear 211), a gear 212, and another gear 21N. A plurality of gears in the transmission assembly 21 are meshed with each other, so that when one gear rotates, other gears may be driven to rotate together. One end of the output shaft 22 is embedded in another gear 210-N. One end of the input shaft 23 is embedded in the input shaft gear 211, and is configured to transfer an external rotation torque to the transmission assembly 21.

In this application, the retarder 20 may be a gear retarder, a worm retarder, a planetary gear retarder, or the like. This is not limited in this application either.

The connection structure 30 is configured to connect the drive motor shaft 130 in the drive motor 10 to the input shaft 23 in the retarder 20, to transfer rotation torque on the drive motor shaft 130 to the input shaft 23. The connection structure 30 may be a device such as a spline or an error-proof coupling. This is not limited in this application either.

A process in which the powertrain 100 implements deceleration is as follows. When the drive motor shaft 130 on the drive motor 10 rotates at a high speed, the drive motor shaft 130 drives, by using the connection structure 30 and the input shaft 23, the input shaft gear 211 to rotate, to transfer rotation torque generated on the drive motor 10 to the input shaft gear 211 in the retarder 20. Then, the drive motor shaft 130 uses a gear with a smaller quantity of teeth to mesh with a gear with a larger quantity of teeth, to convert rotation torque of high-speed rotation into rotation torque of low-speed rotation, so that a rotation speed of the output shaft 22 is lower than a rotation speed of the drive motor shaft 130, thereby achieving deceleration.

The powertrain 100 affects NVH performance of a vehicle. The NVH performance mainly includes electromagnetic noise of the drive motor 10 and noise of a gear of the retarder 20, where sources of the electromagnetic noise and the noise are respectively as follows.

Electromagnetic noise of the drive motor 10: Because the rotor part 120 is embedded in the stator part 11, a gap (or an air gap) exists between the rotor part 120 and the stator part 11. If the alternating magnetic flux generated by the stator part 11 interacts with the permanent magnetic flux generated by the rotor part 120, alternating magnetic pull along a radial direction is generated in the air gap, resulting in periodic dynamic deformation of a stator yoke along the radial direction. Therefore, the stator part 11 is stimulated to generate electromagnetic noise.

Noise of the gear of the retarder 20: There are a plurality of gears in the transmission assembly 21. Generally, when the gears are meshed with each other, and an actively rotating gear drives a passively rotating gear to rotate, a transmission error exists, thereby generating vibration and noise.

Figure 2:
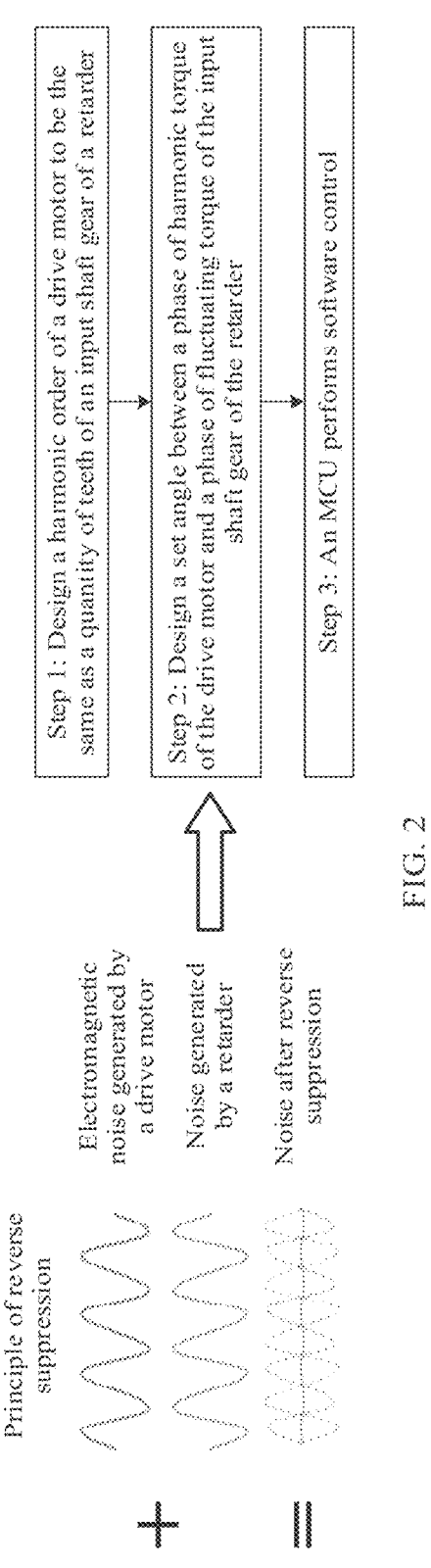
FIG. 2 is a schematic diagram of an implementation process of a principle of using electromagnetic noise generated by a drive motor to offset noise generated by a retarder according to an embodiment of this application.

To reduce the electromagnetic noise of the drive motor 10 and the noise of the gear of the retarder 20, this application provides a solution. As shown in FIG. 2, a drive motor 10 and a retarder 20 are designed according to a specified requirement, so that a harmonic order of the drive motor 10 is the same as a quantity of gear teeth of an input shaft gear 211 in the retarder 20. When a drive motor shaft 130 on the drive motor 10 and an input shaft 23 on the retarder 20 are connected by using a connection structure 30, a set angle exists between the drive motor 10 and the retarder 20, to meet that a phase of an electromagnetic harmonic of the drive motor 10 differs from the gear engagement force harmonic of the retarder 20 by an angle of 180°, or close to 180° (for example, between 150° and 210°). Noise of a powertrain 100 is reduced by reverse offsetting of the two harmonics, to implement noise reduction. A specific implementation process is as follows.

Step 1: Design a harmonic order of a drive motor to be the same as a quantity of teeth of an input shaft gear of a retarder.

An electromagnetic noise harmonic of the drive motor refers to that when a rotor part rotates inside a stator part, an alternating magnetic pull along a radial direction is generated in an air gap, causing a stator yoke part to periodically generate dynamic deformation along the radial direction, and Fourier series decomposition is performed on the dynamic deformation, to obtain components that are greater than an integer multiple of a fundamental frequency. The harmonic order of the drive motor is a quantity of times that the stator yoke is dynamically deformed when the rotor rotates for one cycle. Because the harmonic order of the drive motor is related to a quantity p of magnetic poles of the rotor part, the harmonic order of the drive motor has been determined after the drive motor is produced.

In this application, in a process of producing and designing the powertrain 100, the harmonic order of the drive motor 10 needs to be the same as the quantity of the gear teeth of the input shaft gear 211 of the retarder 20, so that an electromagnetic noise harmonic generated by the drive motor 10 and a noise harmonic generated by the retarder 20 have a same frequency, and the two harmonics can reversely offset each other. A relationship between the harmonic order $O_{order}$ of the drive motor 10 and a quantity Z of the gear teeth of the input shaft gear 211 of the retarder 20 is:

$$O_{order} = N \cdot p = Z \tag{1}$$

The $O_{order}$ represents the harmonic order of the drive motor 10, N represents a dielectric constant of the drive motor 10, p represents a quantity of magnetic poles of a rotor part 120 in the drive motor 10, and Z represents the quantity of the gear teeth of the input shaft gear 211 of the retarder 20.

Step 2: Design a set angle between a phase of harmonic torque of the drive motor and a phase of fluctuating torque of the input shaft gear of the retarder. A most ideal set angle is 180°, and an error of ±30° may be allowed. In this application, an example in which the set angle is 180° is used herein.

In an example, to facilitate description of a phase difference between the drive motor 10 and the retarder 20, concepts of a reference axis A and a rotation axis B are described in the following solution description in this application. A reference axis $A_1$ and a rotation axis $B_1$ are on the drive motor 10. A reference axis $A_2$ and a rotation axis $B_2$ on the input shaft gear 211. In addition, it is specified that an included angle between the reference axis $A_1$ and the rotation axis $B_1$ on the drive motor 10 is $\varphi_1$, and an included angle between the reference axis $A_2$ and the rotation axis $B_2$ on the input shaft gear 211 is $\varphi_2$.

Figure 3:
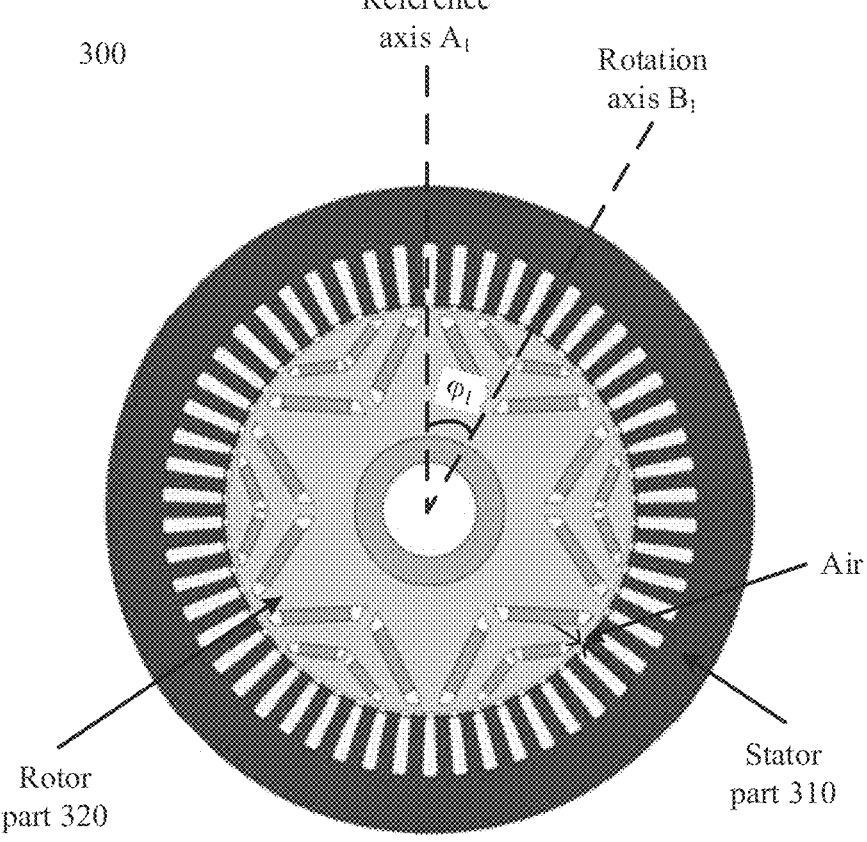
FIG. 3 is a schematic cross-sectional diagram of a drive motor according to an embodiment of this application.

As shown in FIG. 3, a 6-pole 54-slot dual-V-shaped magnetic steel permanent magnet synchronous drive motor 300 is used as an example, and it is specified that a phase A of a stator winding on a stator part 310 is a reference axis A1, and a D axis on a rotor part 320 is a rotation axis $B_1$. In this application, harmonic torque of the drive motor 300 means that when a harmonic current flows through a stator winding of an alternating current drive motor, a harmonic rotating magnetic field of a harmonic rotation speed and corresponding electromagnetic torque are generated.

For the drive motor 300, a phase of the harmonic torque of the drive motor 300 is related to a leading angle α of a three-phase current input to the drive motor 300. The leading angle α is an electrical angle by which a stator current vector leads a q axis in a two-phase rotating coordinate system dq. A relationship between each current in the three-phase current and the leading angle α is:

$$i_A = \sqrt{2} I_s \cos(\omega_s t + \alpha) \tag{2}$$

$$i_B = \sqrt{2} I_s \cos(\omega_s t + \alpha - 120°) \tag{3}$$

$$i_C = \sqrt{2} I_s \cos(\omega_s t + \alpha + 120°) \tag{4}$$

Where iA, iB, and iC represent the three-phase current, IS represents a magnitude of a current, ωS represents a frequency of the three-phase current, and a represents the leading angle.

After the drive motor 300 is energized, alternating magnetic flux generated by the stator part 310 interacts with permanent magnetic flux generated by the rotor part 320, so that the rotor part 320 rotates in the stator part 310, and drives a drive motor shaft 130 to rotate. When an included angle between the D-axis of the rotor part 320 and the phase A of the stator winding of the stator part 310 is the leading angle α or a leading angle α obtained after rotation of one or more periods, in other words, an included angle between the reference axis A1 and the rotation axis B1 of the drive motor 300 is the leading angle α or the leading angle α obtained after rotation of the one or more periods, the harmonic torque of the drive motor 300 reaches a peak value.

In this case, the included angle $\varphi 1$ between the rotation axis $B_1$ and the reference axis $A_1$ of the drive motor 300 is:

$$\varphi_1 = \alpha + k_1 \cdot \frac{360°}{O_{order}} \quad (k_1 = 0, \pm 1, \pm 2, \ldots) \tag{5}$$

α represents the leading angle, $O_{order}$ represents the harmonic order of the drive motor 300, and $k_1$ represents a quantity of cycles in which the rotor part 320 rotates.

Figure 4:
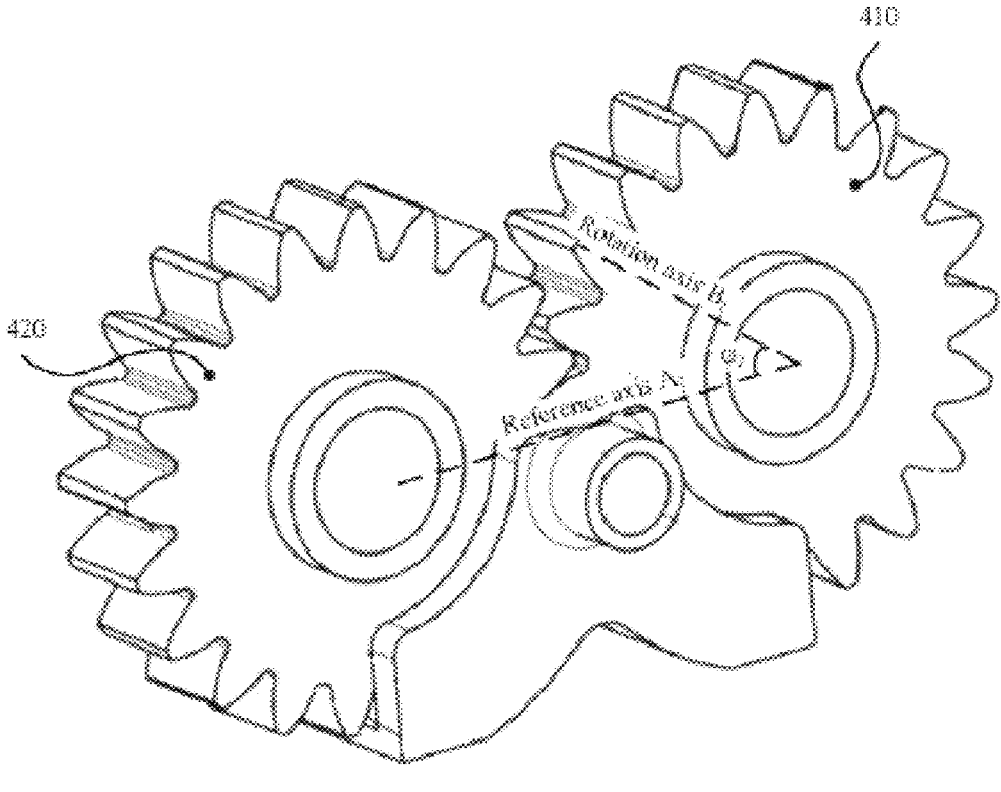
FIG. 4 is a schematic diagram of a structure of an input shaft gear meshed with a gear of the input shaft gear according to an embodiment of this application.

As shown in FIG. 4, an input shaft gear 410 of a retarder with 18 gear teeth is used as an example. It is specified that a connection line between a circle center of the input shaft gear 410 and a circle center of a meshed gear 420 is a reference axis $A_2$, and a connection line between the circle center of the input shaft gear 410 and a vertex of a gear tooth on the input shaft gear 410 is a rotation axis $B_2$.

In this application, fluctuation torque of the input shaft gear 410 is torque when an input shaft gear generates radial deformation, and is generally related to factors such as meshing rigidity, rotation speed fluctuation, and tooth side gap. The meshing rigidity refers to rigidity when the input shaft gear 410 is meshed with the gear 420, and is a main source of fluctuation torque generated by the input shaft gear 410.

When the input shaft gear 410 is in standard meshed, in other words, one gear tooth on the gear 420 is exactly meshed in a groove between two gear teeth of the input shaft gear 410, a vertex of a gear tooth that is on the input shaft gear 420 and that intersects with the reference axis $A_2$ has low rigidity, and load of the gear teeth is heavy. In this case, an included angle φ2 between the rotation axis $B_2$ and the reference axis $A_2$ of the input shaft gear 410 is:

$$\varphi_2 = -\frac{\pi}{2Z} + k_2 \cdot \frac{360°}{Z} \quad (k_2 = 0, \pm 1, \pm 2, \ldots) \quad (6)$$

Z represents a quantity of gear teeth of the input shaft gear 410, and k1 represents a quantity of cycles in which the input shaft gear 410 rotates.

After a drive motor 300 is fastened to the retarder 400 by using a connection structure 30, an included angle φ between a rotation axis $B_1$ on the drive motor 300 and the rotation axis $B_2$ on the input shaft gear 410 is:

$$\varphi = \varphi' + \alpha + \frac{\pi}{2Z} + k_3 \cdot \frac{360°}{O_{order}} (k_3 = 0, \pm 1, \pm 2, \ldots) \quad (7)$$

φ' represents an angle between a reference axis $A_1$ on the drive motor 300 and the reference axis $A_2$ on the input shaft gear 410, and k3 represents a quantity of rotation cycles of a rotor part 320 and the input shaft gear 410.

When φ=180°, it indicates that a difference between a phase of harmonic torque of the drive motor 300 and a phase of the fluctuation torque of the input shaft gear 410 of the retarder 400 is 180°.

In a process of assembling a powertrain 100, to make φ=180°, when a drive motor shaft 13 on a drive motor 10 is embedded into the connection structure 30, the drive motor 10 or a retarder 20 may be rotated. A position of a stator part 11 of the drive motor 10 or a direction of a connection line between a center of the input shaft gear 211 and a center of a gear 212 of the retarder 20 is changed, to change an included angle φ' between a reference axis $A_1$ on the drive motor 10 and a reference axis $A_2$ on an input shaft gear 211 on a retarder 20, so that when a value φ' of the included angle is substituted into formula (7), φ=180°.

In this embodiment of this application, the selected drive motor and the selected retarder need to meet that the harmonic order of the drive motor is the same as the quantity of the gear teeth of the input shaft gear in the retarder, to ensure that the frequency of the electromagnetic noise harmonic generated by the drive motor is the same as the frequency of the noise harmonic generated by the retarder. In a process of installing the drive motor and the retarder, the included angle between the direction of the phase A of the stator winding on the stator part of the drive motor and the direction of the connection line between the circle center of the input shaft gear and the circle center of the engaged gear in the retarder is the set angle, to ensure that the difference between the phase of the electromagnetic noise harmonic generated by the drive motor and the phase of the noise harmonic generated by the retarder is 180°, so that when the powertrain 100 operates, electromagnetic noise of the drive motor can reversely offset noise generated by the input shaft gear on the retarder to reduce noise.

Step 3: A motor control unit (MCU) performs harmonic compensation.

After the powertrain 100 is assembled, production personnel may store drive motor parameters of the drive motor 10 such as the quantity of the magnetic poles of the drive motor 10, the harmonic order, a leading angle α of an electrical signal input to the drive motor 10, and a direction of the phase A of the stator winding on the stator part of the drive motor 10, and retarder parameters of the retarder 20 such as a quantity of the gear teeth of the input shaft gear 211, and a direction of a connection line between the circle center of the input shaft gear 211 and the circle center of the gear 212 in a memory.

The MCU obtains the parameters stored in the memory, and simulates, based on the drive motor parameters and the retarder parameters, an electromagnetic noise harmonic generated by the drive motor 10 and a noise harmonic generated by the retarder 20. Then, the MCU uses the electromagnetic noise harmonic generated by the drive motor 10 to reversely offset the noise harmonic generated by the retarder 20. The simulated electromagnetic noise harmonic of the drive motor and the simulated noise harmonic of the retarder have a same frequency, and a phase difference between the two harmonics is 180°.

Generally, due to factors such as a processing technology of each component in the drive motor 10 and the retarder 20, a change in a relative position after assembly, and a change in an electrical signal input to the drive motor 10, the electromagnetic noise harmonic generated by the drive motor 10 and the noise harmonic generated by the retarder 20 change, or the phase difference between the two harmonics changes. An error generally ranges from 150° to 210°, thereby affecting a reverse suppression effect of the two harmonics. Therefore, after the electromagnetic noise harmonic generated by the drive motor 10 reversely offsets the noise harmonic generated by the retarder 20, a harmonic whose amplitude may be less than the two harmonics before the offsetting is generated (the harmonic is subsequently referred to as a first harmonic).

To improve reverse suppression effect between the electromagnetic noise harmonic generated by the drive motor 10 and the noise harmonic generated by the retarder 20, and further reduce noise of the powertrain 100, the MCU may generate a harmonic that has a frequency and amplitude same as those of the first harmonic but has a phase reverse to that of the first harmonic. The harmonic reversely offsets the first harmonic, to suppress the first harmonic, so that the amplitude of the first harmonic is reduced, and the noise of the powertrain 100 is further reduced.

For example, a phase of an electrical signal input to the drive motor 10 is changed. The MCU detects a waveform of the first harmonic, and simulates, based on the waveform of the first harmonic, a harmonic (subsequently referred to as a second harmonic) that has a frequency same as that of the first harmonic but a phase reverse to that of the first harmonic, so that no noise harmonic is generated or a harmonic with a smaller amplitude that can be ignored is generated after the simulated second harmonic reversely offsets the first harmonic.

Generally, the electromagnetic noise harmonic generated by the drive motor 10 is associated with a phase of a three-phase current input to the drive motor 10. Therefore, after simulating the second harmonic, the MCU detects a waveform of the second harmonic, and changes, based on the waveform of the second harmonic, the phase of the three-phase current input to the drive motor 10, so that a phase of a changed three-phase current meets that the drive motor 10 may generate an additional second harmonic.

After determining the phase of the three-phase current input to the drive motor 10, the MCU may change, through pulse width modulation (PWM), sinusoidal PWM (SPWM), or the like, the phase of the three-phase current input to the drive motor 10, to allow the drive motor 10 to generate the additional second harmonic, so that the electromagnetic noise harmonic generated by the drive motor 10, the additional second harmonic generated by the drive motor 10, and the noise harmonic generated by the input shaft gear 211 of the retarder 20 reversely offset, thereby greatly reducing the noise generated by the powertrain 100, and improving noise reduction effect of the powertrain.

It may be understood that the second harmonic is essentially also an electromagnetic noise harmonic of the drive motor 10. Therefore, changing the phase of the three-phase current is essentially changing the electromagnetic harmonic of the drive motor 10. In this way, the changed electromagnetic harmonic can well reversely offset the noise harmonic generated by the retarder 20, thereby improving the noise reduction effect of the powertrain.

An embodiment of this application provides a powertrain. The powertrain includes a drive motor, a connection structure, and a retarder. A motor shaft in the drive motor is connected to an input shaft in the retarder by using the connection structure, to transfer, to the retarder, drive torque that is generated on the drive motor and that rotates at a high speed. The retarder uses a gear with a smaller quantity of teeth to mesh with a gear with a larger quantity of teeth, to convert rotation torque of high-speed rotation into rotation torque of low-speed rotation, so that a rotation speed of drive torque transmitted to an output shaft in the retarder is lower than a rotation speed of a drive motor shaft, thereby implementing deceleration.

In the powertrain designed in this application, a harmonic order of the drive motor needs to be the same as a quantity of gear teeth of an input shaft gear in the retarder, so that a frequency of an electromagnetic noise harmonic generated by the drive motor is the same as a frequency of a noise harmonic generated by the input shaft gear in the retarder, and the two harmonics can reversely offset.

Because the input shaft and the input shaft gear are fastened, when the motor shaft in the drive motor and the input shaft in the retarder are embedded into the connection structure, an included angle between the phase A of the stator part in the drive motor and a connection direction between the center of the input shaft gear in the retarder and the center of the gear meshed with the center of the input shaft gear in the retarder meets a set angle, so that a difference between a phase of the electromagnetic noise harmonic generated by the drive motor and a phase of the noise harmonic generated by the retarder is 150° to 210°. Subsequently, when the powertrain operates, the electromagnetic noise of the drive motor may reversely offset the noise generated by the input shaft gear on the retarder to reduce the noise.

Figure 5:
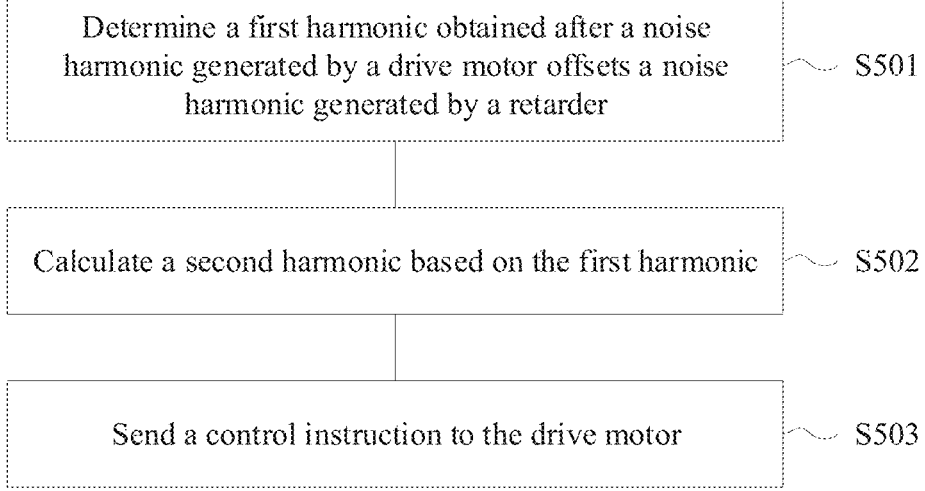
FIG. 5 is a schematic flowchart of a noise suppression method according to an embodiment of this application.

FIG. 5 is a schematic flowchart of a noise suppression method according to an embodiment of this application. As shown in FIG. 5, the noise suppression method may be implemented by the foregoing MCU, or may be implemented by another processor or cloud server. A specific implementation process is as follows:

Step S501: Determine a first harmonic obtained after a noise harmonic generated by a drive motor offsets a noise harmonic generated by a retarder. The noise harmonic generated by the drive motor and the noise harmonic generated by the retarder have a same frequency and reverse phases.

In an example, the MCU obtains parameters stored in a memory, and simulates, based on drive motor parameters and retarder parameters, the electromagnetic noise harmonic generated by the drive motor and the noise harmonic generated by the retarder. Then, the MCU uses the electromagnetic noise harmonic generated by the drive motor to reversely offset the noise harmonic generated by the retarder.

Due to factors such as a processing technology of each component in the drive motor and the retarder, a change in a relative position after assembly, and a change in an electrical signal input to the drive motor, the electromagnetic noise harmonic generated by the drive motor and the noise harmonic generated by the retarder change, or the phase difference between the two harmonics changes. An error generally ranges from 150° to 210°, thereby affecting a reverse suppression effect of the two harmonics. Therefore, after the electromagnetic noise harmonic generated by the drive motor reversely offsets the noise harmonic generated by the retarder, a harmonic whose amplitude may be less than the two harmonics before the offsetting, that is, the first harmonic, is generated. A frequency of the first harmonic is the same as a frequency of the electromagnetic noise harmonic of the drive motor and a frequency of the noise harmonic of the retarder.

Step S502: Calculate a second harmonic based on the first harmonic.

In an example, to improve reverse suppression effect between the electromagnetic noise harmonic generated by the drive motor and the noise harmonic generated by the retarder, and further reduce noise of a powertrain, an MCU may generate a harmonic that has a frequency same as that of the first harmonic but a phase reverse to that of the first harmonic, that is, the second harmonic. The first harmonic reversely offsets the second harmonic, and the first harmonic is suppressed, so that an amplitude of the first harmonic is reduced, thereby further reducing the noise of the powertrain.

Step S503: Send a control instruction to the drive motor.

In an example, the electromagnetic noise harmonic generated by the drive motor is associated with a phase of a three-phase current input to the drive motor. Therefore, after simulating the second harmonic, the MCU detects a waveform of the second harmonic, and changes, based on the waveform of the second harmonic, the phase of the three-phase current input to the drive motor, so that a phase of a changed three-phase current meets that the drive motor may generate an additional second harmonic.

After determining the phase of the three-phase current input to the drive motor, the MCU may change, through PWM, SPWM, or the like, the phase of the three-phase current input to the drive motor, to allow the drive motor to generate the additional second harmonic, so that the electromagnetic noise harmonic generated by the drive motor, the additional second harmonic generated by the drive motor, and the noise harmonic generated by the input shaft gear of the retarder reversely offset, thereby greatly reducing the noise generated by the powertrain, and improving noise reduction effect of the powertrain.

In this embodiment of this application, in a process of assembling a powertrain, a harmonic order of the drive motor is the same as a quantity of gear teeth of an input shaft gear in the retarder, and the phase of the noise harmonic generated by the drive motor is reverse to the phase of the noise harmonic generated by the retarder. In this way, the noise harmonic generated by the drive motor and the noise harmonic generated by the retarder reversely offsets each other, thereby achieving noise reduction effect. However, considering that an error exists in a production and installation process, noise reduction needs to be further performed. A harmonic obtained after the two harmonics reversely offset each other is simulated, and then a compensation harmonic having a frequency same as that of the offset harmonic and a phase reverse to that of the offset harmonic is simulated. A phase of an electrical signal input to the drive motor is controlled, so that the motor generates the compensation harmonic. By generating the compensation harmonic to reversely offset the offset harmonic, noise reduction effect of the powertrain is further improved.

Figure 6:
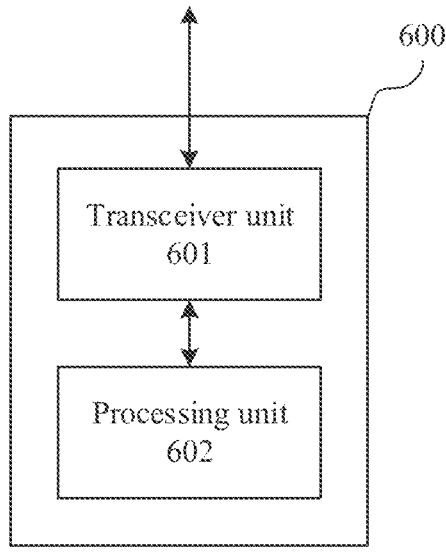
FIG. 6 is a schematic diagram of a structure of a noise suppression apparatus according to an embodiment of this application.

FIG. 6 is a schematic diagram of a structure of a noise suppression apparatus according to an embodiment of this application. As shown in FIG. 6, an apparatus 600 includes a transceiver unit 601 and a processing unit 602. Specific execution functions of the units are as follows.

The processing unit 602 is configured to determine a first harmonic obtained after a noise harmonic generated by a drive motor offsets a noise harmonic generated by a retarder, where a frequency of the noise harmonic generated by the drive motor is the same as a frequency of the noise harmonic generated by the retarder, and a phase of the noise harmonic generated by the drive motor differs from a phase of the noise harmonic generated by the retarder by a set angle. The processing unit 602 is further configured to calculate a second harmonic based on the first harmonic, where the second harmonic is a harmonic having a frequency same as that of the first harmonic and having a phase reverse to that of the first harmonic. The transceiver unit 601 is configured to send a control instruction to the drive motor, where the control instruction is used to enable the drive motor to generate the second harmonic.

In an implementation, the transceiver unit 601 is configured to receive a drive motor parameter and a retarder parameter. The processing unit 602 is further configured to calculate, based on the drive motor parameter and the retarder parameter, the noise harmonic generated by the drive motor and the noise harmonic generated by the retarder, and use the noise harmonic generated by the drive motor to offset the noise harmonic generated by the retarder, to obtain the first harmonic.

In an implementation, the set angle is between 150° and 210°.

In an implementation, the transceiver unit 601 is configured to receive an electrical signal parameter of the drive motor, where the electrical signal parameter includes a first phase parameter of an electrical signal. The processing unit 602 is further configured to calculate, based on the phase of the second harmonic and the first phase parameter, a second phase parameter of the electrical signal input to the drive motor, and send the control instruction to the drive, and adjust a phase of the electrical signal input to the drive motor to a second phase.

Figure 7:
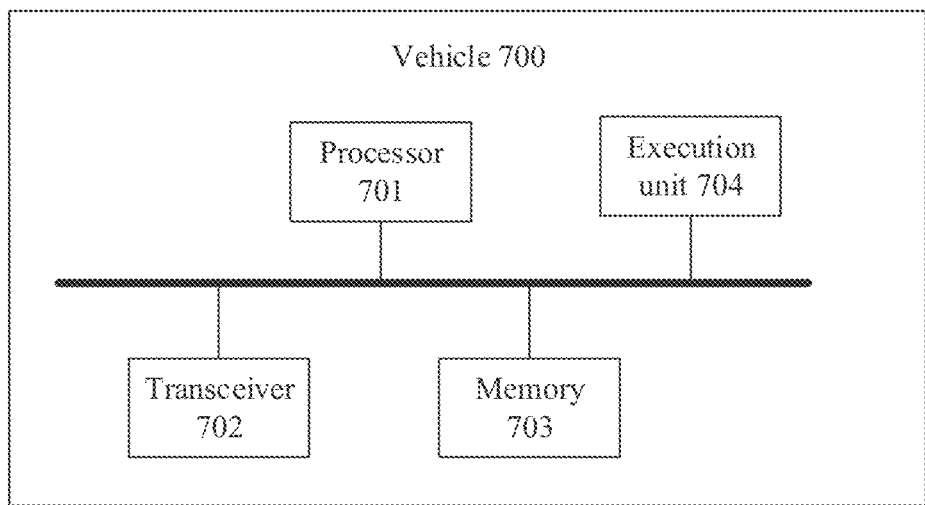
FIG. 7 is a schematic architectural diagram of a vehicle according to an embodiment of this application.

FIG. 7 is a schematic architectural diagram of a vehicle according to an embodiment of this application. As shown in FIG. 7, a vehicle 700 includes a processor 701, a transceiver 702, a memory 703, and an execution unit 704.

The processor 701 may be an MCU, an in-vehicle controller, a domain controller (DC), or the like, or may be a cloud server. In this application, the processor 701 may be configured to simulate, based on a motor parameter and a retarder parameter, an electromagnetic noise harmonic generated by the motor and a noise harmonic generated by the retarder, simulate a second harmonic based on a first harmonic generated after offsetting, calculate, based on the second harmonic, a phase of an electrical signal input to the motor, and the like. For a specific implementation process, refer to FIG. 2, FIG. 5, and the foregoing technical solutions executed by the MCU.

The transceiver 702 may implement signal input (receiving) and output (sending). For example, the transceiver 702 may include a transceiver or a radio frequency chip. The transceiver 702 may further include a communication interface. For example, the vehicle 700 may receive, through the transceiver 702, each control instruction sent by a device such as a DC or an in-vehicle central control system, or may send a motor parameter, a retarder parameter, and the like, or may send a selected control instruction to the execution unit 704, for example, a motor, by using the transceiver 702.

The memory 703 may store a program (or may be instructions or code), and the program may be run by the processor 701, so that the processor 701 performs the technical solutions performed by the MCU in FIG. 2 and FIG. 5. Optionally, the memory 703 may further store data. Optionally, the processor 701 may further read the data stored in the memory 703. The data and the program may be stored in a same storage address, or the data and the program may be stored in different storage addresses. In this solution, the processor 701 and the memory 703 may be separately disposed, or may be integrated together, for example, integrated on a board or a system on a chip (SOC).

It may be understood that a structure illustrated in this embodiment of this application does not constitute a specific limitation on the vehicle 700. In some other embodiments of this application, the vehicle 700 may include more or fewer components than those shown in the figure, or combine some components, or split some components, or have different component arrangements. The components shown in the figure may be implemented by using hardware, software, or a combination of software and hardware.

The present disclosure provides a computer-readable storage medium, where the computer-readable storage medium stores a computer program, and when the computer program is executed in a computer, the computer is enabled to perform any method recorded in FIG. 1 to FIG. 5 and corresponding description content.

The present disclosure provides a computer program product, where the computer program product stores instructions, and when the instructions are executed by a computer, the computer is enabled to implement any method recorded in FIG. 1 to FIG. 7 and corresponding description content.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of this application.

In addition, aspects or features in embodiments of this application may be implemented as a method, an apparatus or a product that uses standard programming and/or engineering technologies. The term product used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a DIGITAL VERSATILE DISC (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term machine readable media may include but is not limited to a radio channel, and various other media that can store, contain and/or carry instructions and/or data.

In the foregoing embodiments, the noise suppression apparatus 600 in FIG. 6 and the vehicle 700 in FIG. 7 may be all or partially implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of the embodiments of this application, but are not intended to limit the protection scope of the embodiments of this application. Any variation or replacement readily figured out by a person skilled in the art within the technical scope disclosed in the embodiments of this application shall fall within the protection scope of the embodiments of this application.

What is claimed is:

1. A noise suppression method comprising:
   obtaining a first harmonic after a first noise harmonic of a drive motor offsets a second noise harmonic of a retarder, wherein a first frequency of the first noise harmonic is the same as a second frequency of the second noise harmonic, and wherein a first phase of the first noise harmonic differs from a second phase of the second noise harmonic by a set angle;
   calculating, based on the first harmonic, a second harmonic having a third frequency the same as that of the first harmonic and having a third phase reverse to that of the first harmonic; and
   sending, to the drive motor, a control instruction to enable the drive motor to generate the second harmonic to suppress the first harmonic.

2. The noise suppression method of claim 1, further comprising:
   receiving a drive motor parameter and a retarder parameter;
   calculating, based on the drive motor parameter and the retarder parameter, the first noise harmonic and the second noise harmonic; and
   setting the first noise harmonic to offset the second noise harmonic to obtain the first harmonic.

3. The noise suppression method of claim 1, wherein the set angle comprises a range between 150 degrees (°) and 210°.

4. The noise suppression method of claim 1, further comprising:

receiving an electrical signal parameter of the drive motor that comprises a first phase parameter of an electrical signal;

calculating, based on the third phase and the first phase parameter, a second phase parameter of an electrical signal input to the drive motor; and adjusting a fourth phase of the electrical signal input to the drive motor to a fifth phase.

5. A noise suppression apparatus comprising:

at least one processor configured to:

obtain a first harmonic after a first noise harmonic of a drive motor offsets a second noise harmonic of a retarder, wherein a first frequency of the first noise harmonic is the same as a second frequency of the second noise harmonic, and wherein a first phase of the first noise harmonic differs from a second phase of the second noise harmonic by a set angle; and calculate, based on the first harmonic, a second harmonic having a third frequency the same as that of the first harmonic and a third phase reverse to that of the first harmonic; and a transceiver coupled to the at least one processor and configured to send, to the drive motor, a control instruction to enable the drive motor to generate the second harmonic to suppress the first harmonic.

6. The noise suppression apparatus of claim 5, wherein the transceiver is further configured to receive a drive motor parameter and a retarder parameter, and wherein the at least one processor is further configured to:

calculate, based on the drive motor parameter and the retarder parameter, the first noise harmonic and the second noise harmonic; and set the first noise harmonic to offset the second noise harmonic to obtain the first harmonic.

7. The noise suppression apparatus of claim 5, wherein the set angle comprises a range between 150 degrees (°) and 210°.

8. The noise suppression apparatus of claim 5, wherein the transceiver is further configured to receive an electrical signal parameter of the drive motor, wherein the electrical signal parameter comprises a first phase parameter of an electrical signal, and wherein the at least one processor is further configured to:

calculate, based on the third phase and the first phase parameter, a second phase parameter of an electrical signal input to the drive motor; and adjust a fourth phase of the electrical signal input to the drive motor to a fifth phase.

9. The noise suppression apparatus of claim 5, wherein the set angle is 180 degrees (°).

10. The noise suppression apparatus of claim 5, wherein the drive motor comprises a radial magnetic field permanent magnet drive motor.

11. The noise suppression apparatus of claim 5, wherein the drive motor comprises an axial magnetic field permanent magnet drive motor.

12. The noise suppression apparatus of claim 5, wherein the drive motor comprises a 6-pole, 54-slot, dual-V-shaped, magnetic steel, permanent magnet synchronous drive motor.

13. The noise suppression apparatus of claim 5, wherein the drive motor comprises a 4-pole, 18-slot, dual-V-shaped, magnetic steel, permanent magnet synchronous drive motor.

14. The noise suppression method of claim 1, wherein the set angle is 180 degrees (°).

15. A computer program product comprising instructions that is stored on a non-transitory computer-readable storage medium and that, when executed by at least one processor, cause a noise suppression apparatus to:

obtain a first harmonic after a first noise harmonic of a drive motor offsets a second noise harmonic of a retarder, wherein a first frequency of the first noise harmonic is the same as a second frequency of the second noise harmonic, and wherein a first phase of the first noise harmonic differs from a second phase of the second noise harmonic by a set angle;

calculate, based on the first harmonic, a second harmonic having a third frequency the same as that of the first harmonic and a third phase reverse to that of the first harmonic; and send, to the drive motor, a control instruction to enable the drive motor to generate the second harmonic to suppress the first harmonic.

16. The computer program product of claim 15, wherein the instructions, when executed by the at least one processor, further cause the noise suppression apparatus to:

receive a drive motor parameter and a retarder parameter;

calculate, based on the drive motor parameter and the retarder parameter, the first noise harmonic and the second noise harmonic; and set the first noise harmonic to offset the second noise harmonic to obtain the first harmonic.

17. The computer program product of claim 15, wherein the set angle comprises a range between 150 degrees (°) and 210°.

18. The computer program product of claim 15, wherein the instructions, when executed by the at least one processor, further cause the noise suppression apparatus to:

receive an electrical signal parameter of the drive motor, wherein the electrical signal parameter comprises a first phase parameter of an electrical signal;

calculate, based on the third phase and the first phase parameter, a second phase parameter of an electrical signal input to the drive motor; and adjust a fourth phase of the electrical signal input to the drive motor to a fifth phase.

19. The computer program product of claim 15, wherein the set angle is 180 degrees (°).

20. The computer program product of claim 15, wherein the drive motor comprises a radial magnetic field permanent magnet drive motor.

* * * * *